A. McDONALD, P. A. ANDERSON & J. O'RILEY.
DITCHING MACHINE.
APPLICATION FILED MAR. 30, 1908.
911,747.
Patented Feb. 9, 1909.
3 SHEETS—SHEET 1.
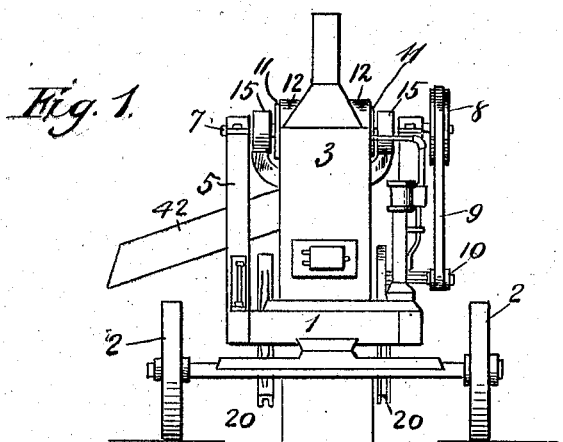
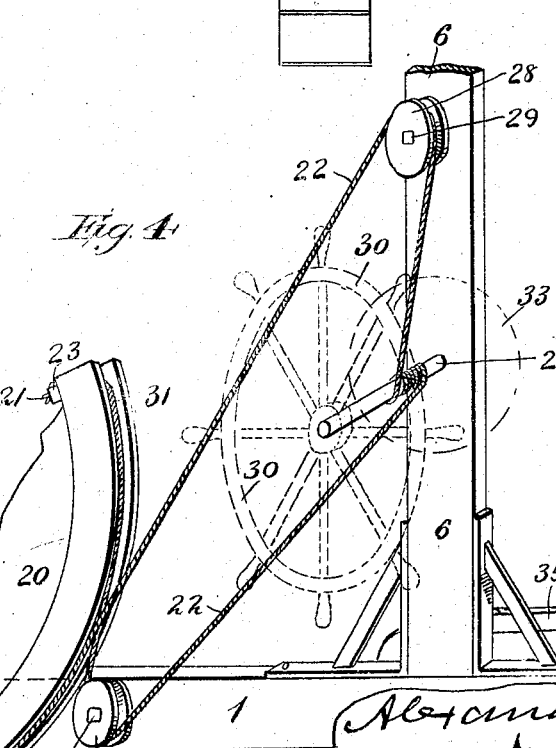

A. McDONALD, P. A. ANDERSON & J. O'RILEY.
DITCHING MACHINE.
APPLICATION FILED MAR. 30, 1908.

911,747.

Patented Feb. 9, 1909.
3 SHEETS—SHEET 2.

Witnesses
F. L. Ourand
R. R. Duffie

Inventors:
Alexander McDonald
Pierce A. Anderson
James O'Riley
By John S. Duffie Attorney

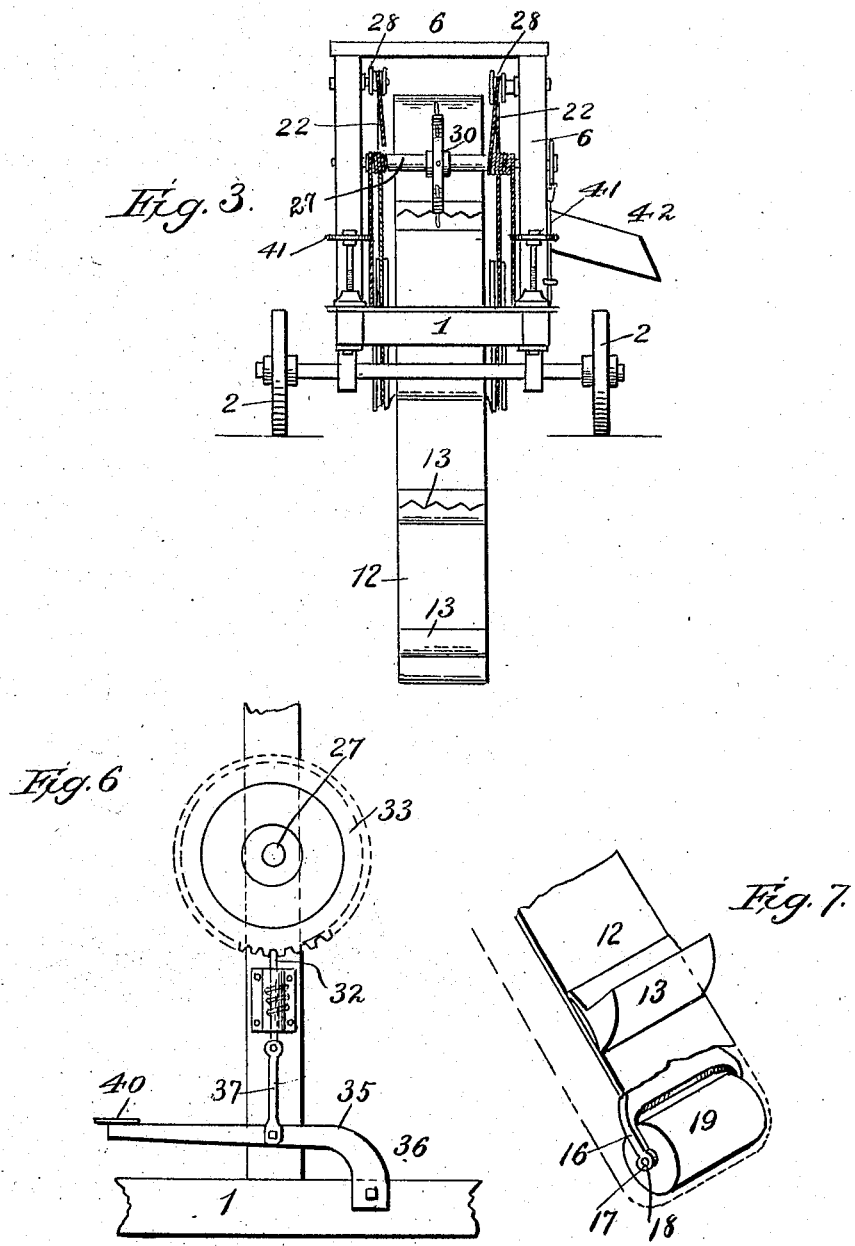

UNITED STATES PATENT OFFICE.

ALEXANDER McDONALD, PIERCE A. ANDERSON, AND JAMES O'RILEY, OF HAVRE, MONTANA.

DITCHING-MACHINE.

No. 911,747.

Specification of Letters Patent.

Patented Feb. 9, 1909.

Application filed March 30, 1908. Serial No. 424,157.

*To all whom it may concern:*

Be it known that we, ALEXANDER MCDONALD, PIERCE A. ANDERSON, and JAMES O'RILEY, citizens of the United States, residing at Havre, in the county of Chouteau and State of Montana, have invented certain new and useful Improvements in Ditching-Machines, of which the following is a specification.

Our invention has relation to new and useful improvements in ditching machines and has as one of its objects to improve the construction of this class of machine, which excavates the dirt and discharges it at one of its sides.

This machine may run on a track and over the ditch that is being dug, and thus the excavation is between the rails, leaving the earth on each side of the ditch, whereon runs the rails, solid; or it may be mounted on ordinary wheels, as shown, and may be self propelling or it may be moved about by animal power, or both.

Another and the main object of our invention is to provide means by which the conveying arm is adjusted so as to give said conveying arm a sweep from a vertical position, to a position where the outer end of the aforesaid conveyer arm is above the ground, thus getting the full benefit of the machine every time the same is moved forward, and furthermore it is pointed out that the width of the ditch depends directly on the width of the buckets, and the said buckets may be detached and others of desired width placed in their stead.

With these and other objects in view our invention consists of the novel construction and arrangement of parts as are hereinafter described in the following specification and pointed out in the claims hereunto appended.

Figure 2:
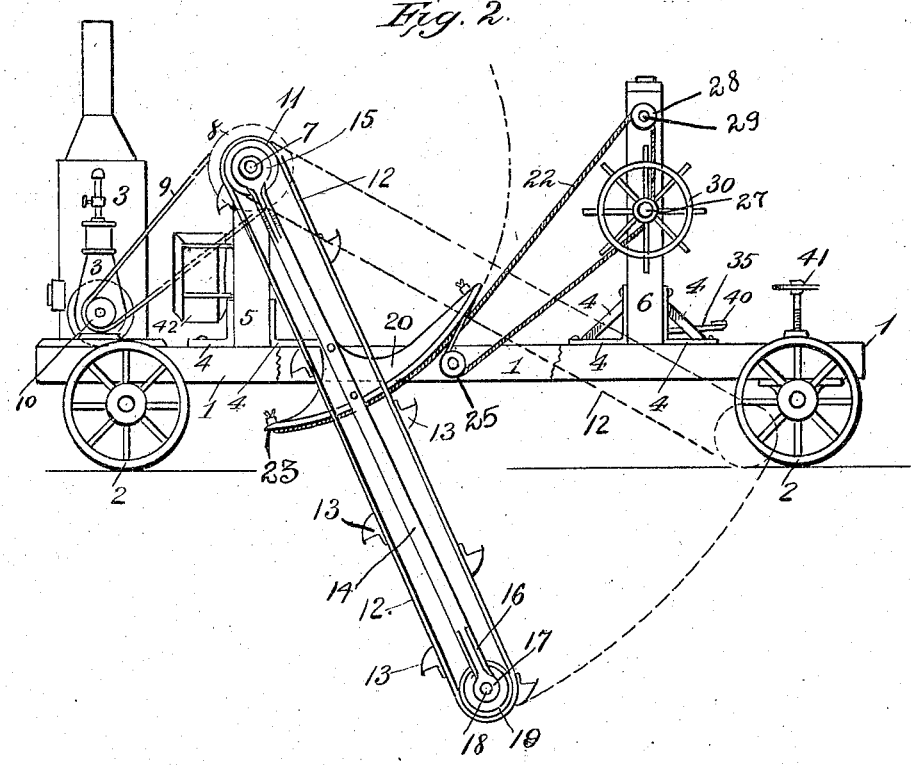
Figure 5:
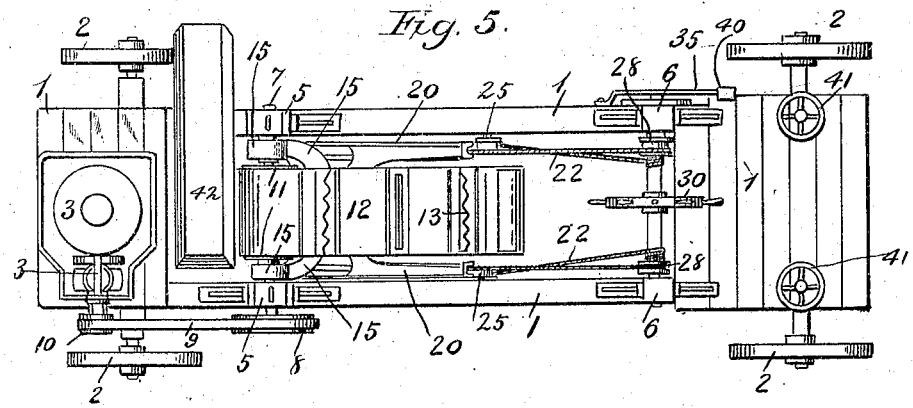

Reference being had to the drawings, which form a part of this specification:—Figure 1, is a front elevation of our ditching machine showing conveying arm in ground, and further showing source of power for operating same. Fig. 2, is a side elevation of our invention showing general arrangement of conveying arm, windlass, and driving engine. Fig. 3, is a rear elevational view, showing clearly, wheels and cables used in adjusting conveying arm; also showing jacks for adjusting and maintaining machine in a level position. Fig. 4, is a perspective view of the windlass and cable mechanism for adjusting conveying arm. Also shows locking device used to prevent the rotation of the windlass, thus maintaining the conveying arm in a desired position. Fig. 5, is a top plan view of our improved machine. Fig. 6, is a detail view of the aforementioned locking device. Fig. 7, is a detail view of the outer end of said conveying arm.

Referring more particularly to the drawings, the supporting frame 1, is mounted on the wheels 2, in the ordinary manner. Power is furnished by means of a steam engine 3, which may be of any one of the usual types. This engine is mounted very near the front end of the supporting frame. Mounted on the said supporting frame 1, and substantially secured thereto by means of braces 4, are vertical frames 5 and 6, one midway between the central portion and each of the front and rear ends of said supporting frame. Mounted and keyed to the shaft 7, of said front vertical frame 5, is a pulley 8, over which runs the belt 9, of the drive wheel 10, of said engine. Also mounted securely on said shaft 7, between the uprights of said vertical frame 5, is the conveying pulley 11, over which runs the conveying belt 12, to which is secured the buckets 13, by any substantial and well known means. The conveying arm 14, is bifurcated at its upper end, forming perforated arms 15, which fit loosely over said shaft 7. The outer end of said conveying arm is recessed forming two smaller arms 16, having eyes 17, wherein is mounted a spindle 18, to which is secured a roller 19, over which rolls said conveying belt 12, of said conveying arm 14. The most horizontal position of the conveying arm necessary, is shown by the dotted lines in Fig. 2; and the deepest possible cut is being made when the said arm is in a vertical position. Secured near the central portion of said conveyer arm, and on either side thereof are rockers 20, having fastening means 21, for the ends of the cable 22. One end of said cable 22, is fastened securely at 23, then runs over the spool 25, which rotates on spindle 26, of said supporting frame. Said cable then entwines around the spindle 27, several turns being made, thence upward and over the spool 28, which is mounted on the spindle 29, of said upright frame 6. The said cable then runs in an inclined downwardly direction, the other end secured to the rocker at 29. As the cable on each side of the windlass works similarly, we deem it necessary to explain the operation of one only.

When it is desired to elevate the conveying arm the hand wheel 30, is rotated forwardly; thus spindle 27, also rotates, as said wheel 30, is keyed thereto; the result being that said cable 22, is drawn over said spool 28 and wound around spindle 27, thus elevating the conveying arm to any desired position. That part of said cable that is already entwined around said spindle 27, is paid out and rolls over spool 25, passing into the groove 31, cut in rocker 20. When it is desired to lower said conveying arm the wheel is rotated in a reverse direction and the reverse action of the cable and the conveying arm is the result. When said conveyer arm is in the desired position the spring actuated pin 32, (Fig. 6) is allowed to engage the sprocket wheel 33, mounted and keyed to the outer projecting end 34, of said spindle 27. Said pin is actuated by a lever 35, which is pivoted to said supporting frame at 36; the upright arm 37, is secured to said lever near its center and has at its upper end an eye 38, wherein the lower end of said pin is pivoted. The spring 39, holds the pin in engagement with said sprocket wheel 33, normally; so when it is desired to turn the said wheel the pin is disengaged by pressing the foot on the foot-rest 40, of said unlocking lever. This stretches the spring and when the conveying arm is at the desired angle the foot is removed and said spring actuated pin 32, shoots back again into engagement with said sprocket wheel. It is obvious that the locking mechanism may be on either side of the machine, or both.

So that our machine may be adjusted and maintained in a level position, jacks 41, are supplied at the rear end directly over the rear axle for this purpose.

Secured to the front side of the uprights of the vertical frame 5, is a chute 42, wherein the dirt is dumped from the buckets 13, and is shot off to the side of the machine. This chute may be arranged on either side of the machine, or both.

Though we have specifically described our invention we claim the right to make such alterations and changes in its construction and arrangement as will be within the scope and not depart from the spirit of our invention and which will be obviously necessary in its manufacture.

Having described our invention what we claim as new and desire to secure by Letters Patent is:—

1. In a device of the character described, a supporting frame mounted on wheels, rear and front vertical frames secured to said supporting frame, said vertical frames held substantially in position by means of braces, said forward frame provided with a spindle mounted near the upper ends of the uprights thereof, a pulley keyed to the projecting end of said spindle, a pulley mounted on said spindle between the vertical uprights of said frame, a conveying arm bifurcated at its upper end, forming two parallel arms having perforations passing through the center thereof, said arms pivotally mounted on said spindle, one of each of said arms on each side of said pulley, the lower end of said conveying arm recessed to form two smaller parallel arms having eyes passing through the center thereof, a spindle rotatably mounted in said eyes, a roller keyed to said last-mentioned spindle, an endless conveying belt, a number of buckets secured to the outer surface thereof at certain spaced intervals apart, said belt adapted to work over said pulley of said first-mentioned spindle and said roller of said last-mentioned spindle, means to vary the position of said conveying arm in a vertical plane, said means comprising a windlass together with rockers, one secured to each side of said conveying arm near the center thereof, means to hold the conveying arm in a desired position.

2. In a device of the character described, a conveying arm suitably pivoted at its upper end to allow it to assume different positions in a vertical plane, means to cause said conveying arm to assume different desired positions, said means comprising rockers, one secured to each side of said conveying arm near the center thereof, a rear vertical frame, a spindle mounted thereon near the center thereof, spools mounted on said rear vertical frame, cables, the ends of each being secured to one of said rockers, spools mounted on the supporting frame of said device, said cables passing under said last-mentioned spools, then entwining around said spindle, then passing over said first-mentioned spools, then their other ends each secured to one of said rockers, a hand-wheel keyed at the center of said spindle adapted to rotate the same, means to lock said spindle against rotation, said means comprising a sprocket wheel secured to the outwardly extending projection of said spindle.

3. In a device of the character specified, a conveying arm adapted to assume different desired positions in a vertical plane, means to cause said conveying arm to assume such positions, said means comprising a spindle, means to lock said first-mentioned means, said means consisting of a sprocket wheel keyed to the outer projecting end of said spindle of said first-mentioned means, a foot lever, a vertical arm secured thereto at its center, a spring-held pin pivotally connected to the upper end of said vertical arm, said pin adapted to normally engage one of the teeth of said sprocket wheel, said foot lever adapted to throw said spring-held pin out of engagement with the teeth of said sprocket wheel.

In testimony whereof we affix our signatures, in presence of two witnesses.

ALEXANDER McDONALD.
PIERCE A. ANDERSON.
JAMES O'RILEY.

Witnesses:
M. C. BEEDE,
JOHN JOHNSON.